(12) United States Patent
Ohmi et al.

(10) Patent No.: US 8,485,534 B2
(45) Date of Patent: Jul. 16, 2013

(54) METAL GASKET

(75) Inventors: Tadahiro Ohmi, Sendai (JP); Yasuyuki Shirai, Sendai (JP); Koji Sato, Gojo (JP); Masayuki Noguchi, Tokyo (JP); Tsutomu Yoshida, Tokyo (JP); Akira Muramatsu, Machida (JP); Satoshi Kumaki, Gojo (JP); Yuki Kuwamura, Gojo (JP)

(73) Assignees: Tohoku University, Sendai-Shi (JP); Nippon Valqua Industries, Ltd., Tokyo (JP)

( * ) Notice: Subject to any disclaimer, the term of this patent is extended or adjusted under 35 U.S.C. 154(b) by 394 days.

(21) Appl. No.: 12/993,628

(22) PCT Filed: May 7, 2009

(86) PCT No.: PCT/JP2009/058607
§ 371 (c)(1),
(2), (4) Date: Nov. 19, 2010

(87) PCT Pub. No.: WO2009/142110
PCT Pub. Date: Nov. 26, 2009

(65) Prior Publication Data
US 2011/0084456 A1    Apr. 14, 2011

(30) Foreign Application Priority Data

May 20, 2008    (JP) .................................. 2008-131685

(51) Int. Cl.
*F16L 21/05*    (2006.01)
*F16J 15/02*    (2006.01)

(52) U.S. Cl.
USPC ............ 277/603; 277/608; 277/637; 285/368

(58) Field of Classification Search
USPC ................. 277/603, 608, 626–627, 630, 637, 277/639, 644, 647; 285/368, 363–367
See application file for complete search history.

(56) References Cited

U.S. PATENT DOCUMENTS

| | | | | |
|---|---|---|---|---|
| 1,789,595 | A * | 1/1931 | Oven | 138/114 |
| 3,519,281 | A * | 7/1970 | Teucher et al. | 277/601 |
| 3,712,647 | A * | 1/1973 | Stecher | 285/318 |
| 3,761,102 | A * | 9/1973 | Nicholson | 277/647 |
| 3,806,138 | A * | 4/1974 | Herrington | 277/653 |
| 4,114,905 | A * | 9/1978 | Mercier | 277/645 |
| 4,218,067 | A | 8/1980 | Halling | |
| 5,022,663 | A | 6/1991 | Fages et al. | |
| 2002/0153669 | A1 | 10/2002 | Caplain et al. | |
| 2004/0201180 | A1 * | 10/2004 | Shah et al. | 277/592 |
| 2005/0189724 | A1 | 9/2005 | Schmitz | |
| 2007/0170662 | A1 | 7/2007 | Williams et al. | |
| 2011/0192369 | A1 | 8/2011 | Schmitz | |

FOREIGN PATENT DOCUMENTS

| | | |
|---|---|---|
| CN | 101163909 A | 4/2008 |
| EP | 0378436 A2 | 7/1990 |
| GB | 2041112 A | 9/1980 |
| JP | 1115061 U | 8/1989 |

(Continued)

*Primary Examiner* — Vishal Patel
(74) *Attorney, Agent, or Firm* — The Webb Law Firm

(57) ABSTRACT

A metal gasket includes an outer ring that is formed in a substantially C-shaped cross-section having an opening in a circumferential direction and an inner ring that is disposed inside the outer ring, wherein the inner ring is configured in a polygonal shape of a cross section, and a pair of corner portions opposing to each other in the inner ring are disposed on inner circumferential faces on the both sides of the opening in the outer ring.

11 Claims, 4 Drawing Sheets

FOREIGN PATENT DOCUMENTS

| | | |
|---|---|---|
| JP | 2026367 A | 1/1990 |
| JP | 2113171 A | 4/1990 |
| JP | 07332498 A | 12/1995 |
| JP | 9264427 A | 10/1997 |
| JP | 11210885 A | 8/1999 |
| JP | 2000257717 A | 9/2000 |

* cited by examiner

METAL GASKET

TECHNICAL FIELD

The present invention relates to a metal gasket that is used as a seal member under the severe conditions such as a high temperature, a high pressure, and a vacuum for a wide variety of pipe arrangements, machinery, and equipment in the fields of a nuclear power, a semiconductor and so on. More specifically, the present invention relates to a metal gasket provided with an excellent sealing property by a small tightening force.

BACKGROUND ART

For an application that requires a higher sealing property that does not allow a permeation leakage like a high vacuum application and a heat resistance property to a baking processing for degassing or the like, a metal gasket made of a soft metal material provided with the excellent sealing and heat resistance properties is used in general rather than a material made of a rubber or an elastomer.

In order to ensure a stable sealing property by using a metal gasket as described above, a tightening force must be extremely enlarged as compared with the cases of a rubber and an elastomer. As a result, in the case in which a metal gasket is used, a strain of a tightening work is increased and a fastening substance such as a flange and a bolt grows in size most commonly.

Moreover, in the case of a gasket in an O-ring shape, that is, a gasket that is not in a sheet-like shape, the gasket is used in general in the state in which the gasket is tightened in a gasket mounting groove when the gasket is mounted. On the other hand, in the case of a gasket made of a rubber or an elastomer in an O-ring shape, the gasket is greatly deformed by a low tightening load. Consequently, in the state in which a bolt is tightened in a stepwise manner, a bolt can be easily rotated and tightened when the gasket is tightened. On the other hand, in the state in which a bolt is attained to be tightened in a groove, the bolt cannot be rotated in a timely fashion or the bolt is rotated hardly.

Consequently, in the case of a gasket made of a rubber or an elastomer in an O-ring shape, it is easy to manage a tightening of a bolt even by a manual work.

On the other hand, in the case of a gasket made of metal in an O-ring shape, a large force is basically required to deform the gasket, whereby it is hard to find a change of a moment when a bolt is tightened to a groove. Therefore, it is hard to manage a tightening of a bolt by a manual work unfortunately.

As a gasket made of metal in an O-ring shape, a metal hollow O-ring and a metal C-ring provided with a spring are also known. Even in the case of a metal hollow O-ring and a metal C-ring provided with a spring, it is hard to find a change of a moment when a bolt is tightened, whereby it is hard to manage a tightening of a bolt by a manual work unfortunately. Moreover, in the case of a hollow metal O-ring and a metal C-ring provided with a spring, the rings can be easily deformed by modifying a wall thickness or a dimension of a part that specifies the entire shape such as "O" and "C". Moreover, in the case of a metal C-ring provided with a spring, the ring can be easily deformed by properly modifying a thickness of a spring that is installed in the ring. However, in the case in which a thickness of a spring is modified, a reaction force or a stress of a seal face is degraded, whereby a sealing property is also degraded unfortunately.

A wide variety of proposals have been carried out in order to improve a sealing property for a hollow metal O-ring and a metal C-ring provided with a spring.

For instance, a soft layer (such as a metal plate and a rubber coating) is disposed on a seal face of a metal gasket, or a shape that causes a concentration of stress on a seal face of a metal gasket is adopted. In other words, to adopt a shape that causes a concentration of stress, a projecting portion is formed on a seal face in Patent document 1, and a concave groove is formed on a seal face in Patent document 2.

However, even by the above ideas for an improvement, a sealing property cannot be displayed to a satisfactory extent by a smaller tightening force.

Moreover, in the case in which a shape that causes a concentration of stress on a seal face is adopted like the Patent documents 1 and 2 in particular, a flaw may be remained on a face of a flange on the other side due to the shape of the seal face, whereby a problem occurs in a reuse of a flange in some cases. Moreover, since a portion of a concentration of stress is in a convex shape, the portion may be easily damaged, whereby a care and an attention must be paid in handling unfortunately in particular.

PRIOR ART DOCUMENTS

Patent Document

Patent document 1: Japanese Patent Application Laid-Open Publication No. 2-113171
Patent document 2: Japanese Patent Application Laid-Open Publication No. 9-264427

The present invention was made in consideration of such conditions, and an object of the present invention is to provide a metal gasket in which a high sealing property can be obtained by a small tightening force, in which it is easy to manage a tightening of a bolt even in the case in which a bolt is tightened by a manual work, and in which a face of a flange on the other side can be prevented from being damaged.

SUMMARY OF THE INVENTION

In order to achieve the above described purpose, a metal gasket in accordance with the present invention is characterized by comprising an outer ring that is formed in a substantially C-shaped cross-section having an opening in a circumferential direction and an inner ring that is disposed in a fitting state inside the outer ring, wherein said inner ring is configured in a polygonal-shaped cross-section, and a pair of corner portions opposing to each other in the inner ring are arranged on inner circumferential face on the both sides of said opening in said outer ring.

By the metal gasket provided with the above configuration, corner portions of the inner ring are abutted to the outer ring and are strongly pressed partially, and the other parts are loosely abutted to the outer ring, whereby the total tightening force for obtaining a sealing force can be small.

The metal gasket in accordance with the present invention is characterized in that said inner ring is configured in a cross-section of a quadrangular shape preferably.

By the metal gasket provided with the above configuration, a sealing property can be increased by the inner ring of a simple configuration.

The metal gasket in accordance with the present invention is characterized in that an apex portion of said inner ring configured in the polygonal shape is formed in an arc shape preferably.

By the metal gasket provided with the above configuration, an adhesion property of the inner ring to the outer ring is satisfactory, whereby a sealing property can be satisfactorily maintained and the inner ring can be prevented from being moved in a circumferential direction.

Moreover, in the case in which an apex portion is acute-angled, a concentration of stress occurs in excess, whereby damages may be applied, for instance, the outer ring may be damaged or a depression may be formed on a sealing face on a flange on the other side. However, in the case in which an apex portion is formed in an arc shape, the damages can be suppressed.

The metal gasket in accordance with the present invention is characterized in that a metal that configures said inner ring is harder than a metal that configures said outer ring preferably.

In the case in which the inner ring is harder than the outer ring as described above, the inner ring of a high degree of hardness presses the outer ring of a low degree of hardness outward, and a fitting property of the outer ring of a low degree of hardness to a material on the other side is satisfactory, whereby a sealing property is also satisfactory.

The metal gasket in accordance with the present invention is characterized in that a soft layer is disposed on at least a surface on an outer circumferential side of said outer ring preferably. As a soft layer, a resin, a proper rubber, and a metal plate made of soft metal can be adopted for instance.

Even in the case in which a soft layer is disposed on at least a surface on an outer circumferential side of the outer ring, a fitting property of the outer ring of a low degree of hardness to a material on the other side can be satisfactorily maintained.

By the metal gasket in accordance with the present invention, the total tightening load that is required for obtaining a sealing property equivalent to that of a conventional metal gasket can be lowered, and a deforming amount is larger in the case in which a certain amount of a tightening load is applied. Consequently, a high sealing property can be obtained to a satisfactory extent by a small tightening force. Moreover, in the case in which a bolt is tightened by a manual work, the bolt is rotated hardly at a moment when a bolt is tightened to a groove. Therefore, it is easy to manage a tightening of a bolt by a manual work.

Furthermore, since a surface on an outer circumferential side of the outer ring is a curved surface in which a projecting portion does not exist, a face of a flange on the other side can be prevented from being damaged.

BRIEF DESCRIPTION OF THE DRAWINGS

FIG. 3 is a partially enlarged cross-sectional view showing a state in which the metal gasket of FIG. 1 is used for a flange part of a pipe or the like.

DETAILED DESCRIPTION OF THE INVENTION

An embodiment (example) of a metal gasket in accordance with the present invention will be described below in detail with reference to the drawings.

Figure 1:
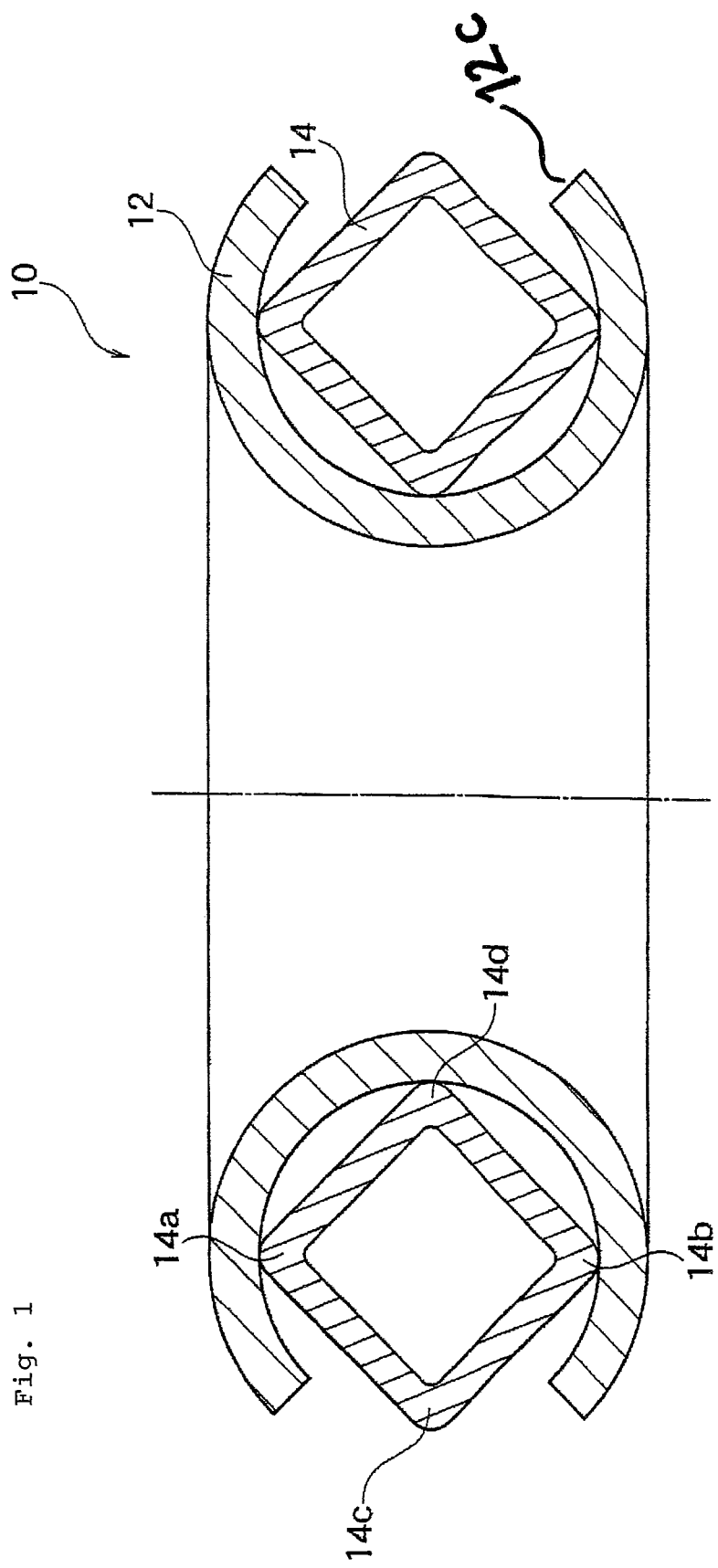
FIG. 1 is a cross-sectional view showing a metal gasket in accordance with an embodiment of the present invention.

FIG. 1 is a cross-sectional view showing a metal gasket in accordance with a presently preferred embodiment of the present invention.

As shown in FIG. 1, a metal gasket 10 is configured by an outer ring 12 that is formed in a generally C-shaped cross-section and a hollow inner ring 14 in a generally quadrangular shape of a cross section.

It is preferable that a metal that configures the inner ring 14 is harder than a metal that configures the outer ring 12. It is preferable that the outer ring 12 is made of aluminum that is a so-called soft metal, and the inner ring 14 is made of a metal that is harder than aluminum, such as a stainless steel.

Figure 2:
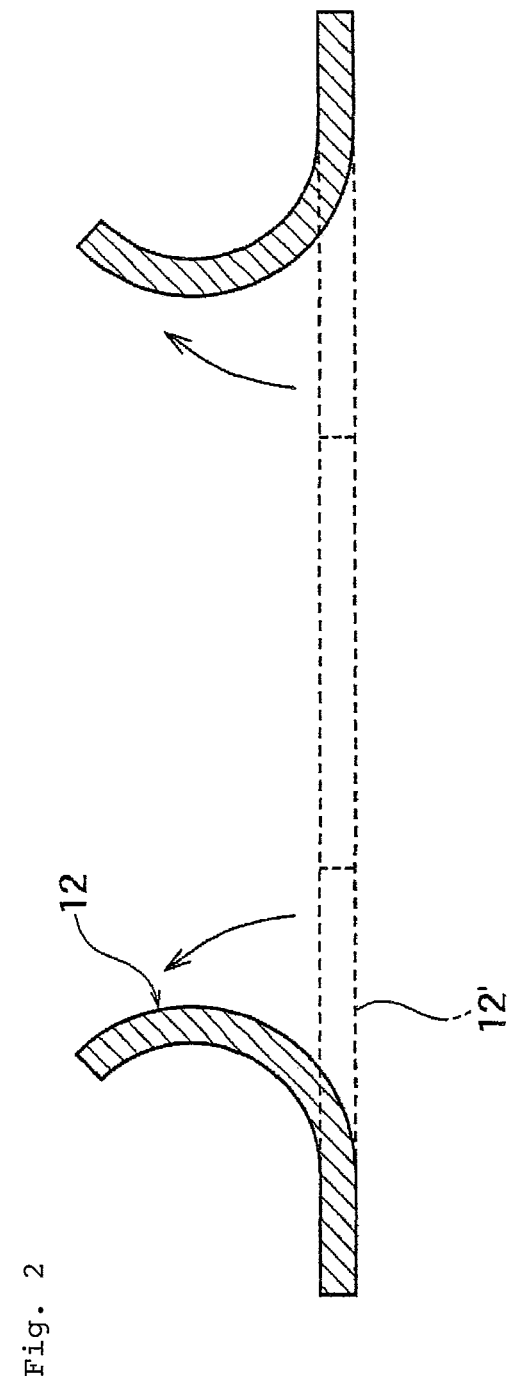
FIG. 2 is a cross-sectional view showing a procedure in forming an outer ring shown in FIG. 1.

In other words, for the metal gasket 10 in accordance with the present embodiment, a degree of hardness of the outer ring 12 that is disposed on a seal face is lower than that of the inner ring 14, whereby the outer ring 12 is formed in such a manner that the outer ring 12 can be easily deformed. As shown in FIG. 2, the outer ring 12 is formed by preparing an aluminum plate 12' that has been punched in a ring shape and in a tabular shape and by rolling and reforming the aluminum plate 12' in a pipe shape.

On the other hand, for the inner ring 14, a square tube pipe that is in a quadrangular shape of a cross section is prepared for instance. The square tube pipe is formed in a circular pattern, and the both ends of the square tube pipe are welded to form the inner ring 14. Moreover, the inner ring 14 made of the square tube pipe is formed in a circular pattern in such a manner that a pair of corner portions 14a and 14b are arranged in an axis direction (a vertical direction) and the other pair of corner portions 14c and 14d are arranged in a horizontal direction (a radial direction) as shown in FIG. 1. Consequently, after the inner ring 14 in a circular pattern is formed at first, the outer ring 12 is rolled and reformed in such a manner that the outer ring 12 covers the outside of the inner ring 14, whereby the metal gasket 10 composed of the inner ring 14 and the outer ring 12 can be formed as shown in FIG. 1. A method for fabricating the outer ring 12 and the inner ring 14 and an assembly method of the outer ring 12 and the inner ring 14 are not restricted to the above embodiment at all.

By the present embodiment, since a pair of corner portions 14a and 14b of the inner ring 14 are arranged on inner circumferential faces on the both sides of the opening 12c in the outer ring 12, the outer ring 12 can be strongly pressed from the inner side. By this configuration, the inner ring 14 functions as an elastic component, and the outer ring 12 functions as a sealing component.

Figure 3:
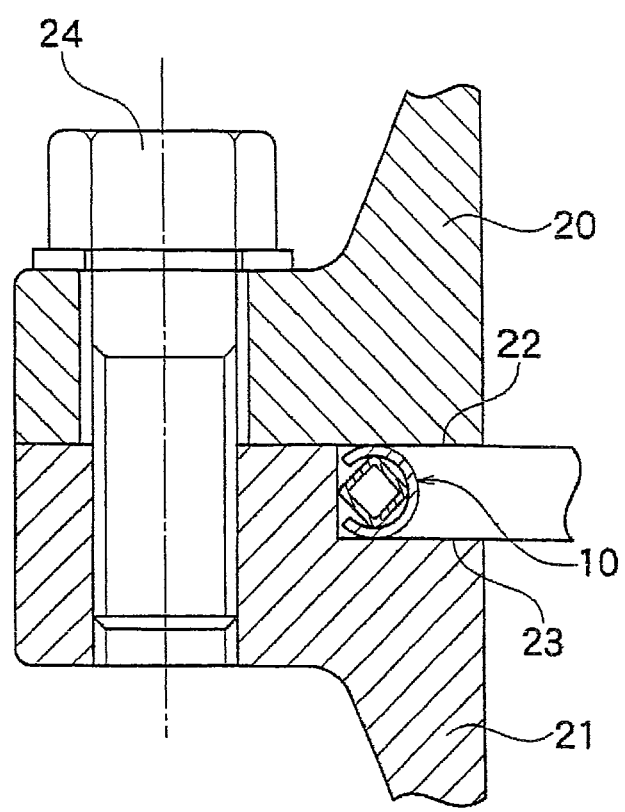

The metal gasket 10 having the above configuration is disposed between flange faces 22 and 23 of the joint portions of pipes 20 and 21 that are used for a semiconductor production for instance, and is tightened by a bolt 24 or the like as shown in FIG. 3. Moreover, in order to improve a sealing property of the outer ring 12 that configures the metal gasket 10, a coating such as polytetrafluoroethylene (PTFE) and polyimide or a plate such as silver, nickel, and copper can also be applied to a surface of the outer ring 12.

The tightening process of the metal gasket 10 that is configured as described above will be described in the following.

For the metal gasket 10 in accordance with the present invention, in the case in which the metal gasket 10 is disposed between flange faces 22 and 23 of the materials 20 and 21 that are objects to be sealed and a prescribed tightening force is applied to the metal gasket 10 by a bolt 24 or the like as shown in FIG. 3, an outer circumferential side of the outer ring 12 is compressed at first. At this time, parts to which a pair of corner portions 14a and 14b of the inner ring 14 are abutted are hard to be deformed for the outer ring 12. However, the other parts of the outer ring 12 fit in flange faces 22 and 23 by slow degrees since a proper compressive force is applied to the other parts. By the above configuration, a sealing property is ensured. Moreover, the outer ring 12 is made of a soft metal, and an insulation displacement contact of the pair of corner portions 14a and 14b is carried out to an inner circumferential face of the outer ring 12. Consequently, a sealing property can be satisfactorily maintained in the state in which the total tightening force is suppressed to be small.

At this time, since the outer ring 12 has a configuration in which an insulation displacement contact of the pair of corner portions 14a and 14b is carried out to an inner circumferential face of the outer ring 12, a stress is concentrated to the portions and the outer ring 12 can fit in flange faces in the state in which the total tightening force is suppressed to be small, whereby a sealing property can be satisfactorily maintained.

Moreover, in the present embodiment, even in the case in which a bolt is tightened by a manual work, the bolt is rotated hardly at a moment when a bolt is tightened to a groove. Therefore, a management of a tightening of the bolt can be carried out by a manual work.

At the time point when the metal gasket 10 is compressed, the parts to which a pair of corner portions 14a and 14b of the inner ring 14 are not abutted are easily deformed for the outer ring 12.

On the other hand, the inner ring 14 is easily deformed since the inner ring 14 is expanded in a radial direction of the metal gasket 10 (in a transverse direction of the cross sectional view) in the case in which the metal gasket 10 is compressed. Moreover, since a reaction force in a vertical direction (in a compressive direction) is maintained in the case in which the inner ring 14 is deformed, the metal gasket 10 can be greatly deformed by a low load. Consequently, in the case in which a tightening of the bolt is carried out by a manual work, the bolt can be easily rotated in tightening the bolt. Moreover, in the state in which a bolt is attained to be tightened in a groove, the bolt cannot be rotated, whereby it is easy to manage a tightening of a bolt.

As described above, for the metal gasket in accordance with the present invention, a high sealing property can be ensured to a satisfactory extent in the state in which the total tightening force is suppressed to be small even in the case of a metal gasket in a shape of an O-ring. Moreover, in the state in which a bolt is attained to be tightened in a groove, the bolt cannot be rotated on the instant, whereby it is easy to carry out a management of a tightening of a bolt by a manual work.

While a metal gasket of the preferred embodiment in accordance with the present invention have been described above, the present invention is not restricted to the embodiment, and various changes, modifications, and functional additions can be thus made without departing from the scope of the present invention.

Figure 4:
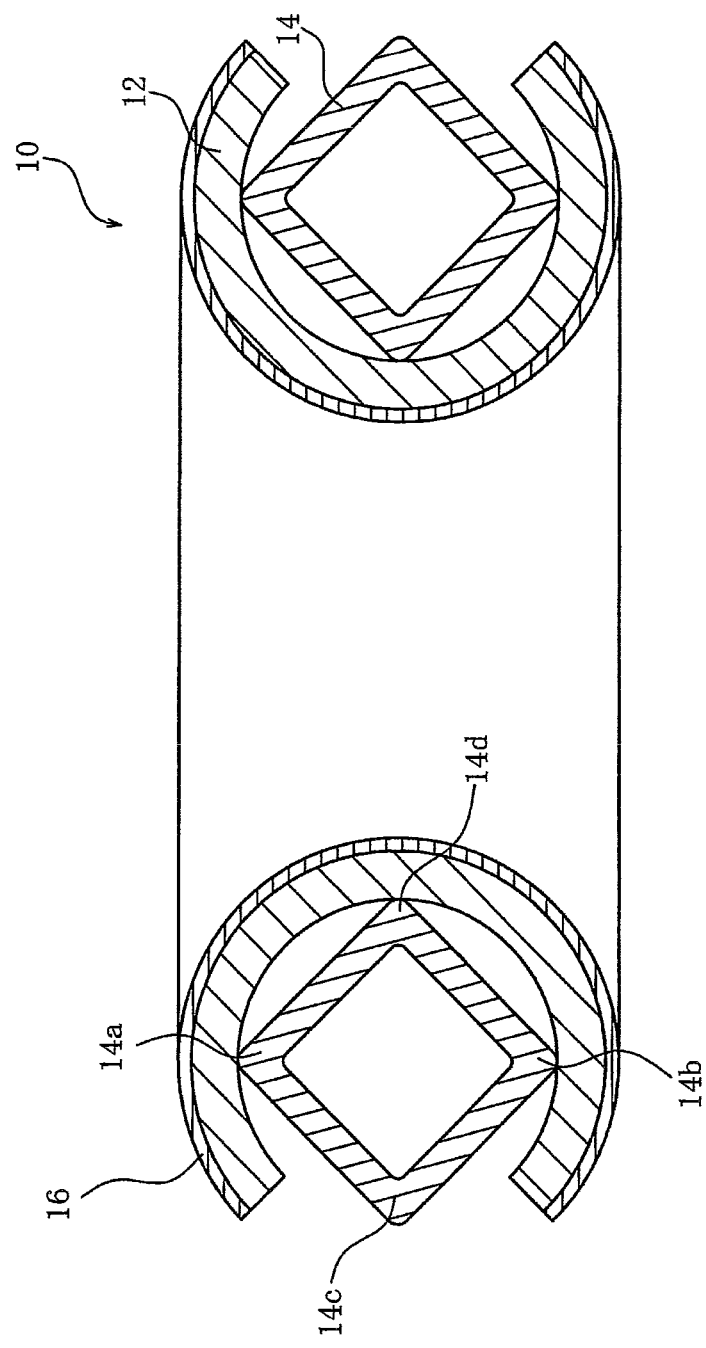
FIG. 4 is a cross-sectional view similar to FIG. 1 showing a soft layer disposed on a surface of the outside of the outer ring.

For instance, it is also possible that the outer ring 12 is not made of a single metal but made of an alloy. Moreover, a soft layer 16 can be disposed on a surface of the outside of the outer ring 12 that configures a seal face by a coating of a material such as a resin and a rubber or a plate. In the case in which a soft layer 16 is separately disposed on the outer ring 12, a material of the soft layer can be properly selected according to the conditions, see FIG. 4.

As described above, in the case in which a proper soft layer 16 is disposed on a surface of the outside of the outer ring 12, a sealing property of a gasket can be improved. Moreover, in the state in which a soft layer 16 is disposed on a surface of the outer ring 12, a soft layer 16 can be formed on at least a surface on an outer circumferential side of the outer ring 12, and it is not required to form a soft layer on the entire outside of the outer ring 12. However, in consideration of the workability, it is practical that a soft layer is formed on the entire outside of the outer ring 12.

Although the inner ring 14 is formed in a quadrangular shape of a cross section in the above embodiment, a shape of the inner ring 14 is not restricted to a quadrangular shape providing the inner ring 14 is formed in a polygonal shape. For instance, the inner ring 14 can also be formed in a hexagonal shape of a cross section. The point is that the inner ring 14 is formed in a shape in which the inner ring 14 almost evenly presses the symmetrical positions on the both sides of the central opening of the outer ring 12.

The metal gasket in accordance with the present invention can be used on a wide range under the severe conditions such as a high temperature, a high pressure, a vacuum, and a low temperature for a wide variety of fields such as a ultra vacuum flange, a vacuum instrument, a deposition apparatus, a sputtering apparatus, a CVD apparatus, and a wide variety of vacuum pumps.

As shown in FIG. 1, in the case in which the inner ring 14 is in a quadrangular shape for instance, it is preferable that an apex portion of the outer surface of a pair of corner portions 14a and 14b is formed in an arc shape, in particular in a radius in which the apex portion closely comes into contact with an inner circumferential face of the outer ring 12. In the case in which the inner ring 14 is formed in a radius equivalent to that of the inner circumference of the outer ring 12 as described above, the inner ring 14 closely comes into contact with the outer ring 12 in a sliding manner, whereby a deformation of the outer ring 12 due to the inner ring 14 can be prevented.

Moreover, in the case in which a dimensional design is carried out in such a manner that a pair of corner portions 14a and 14b of the inner ring 14 closely comes into contact with an inner circumferential face of the outer ring 12, a displacement and a diagonal inclination of the inner ring 14 that is caused by the case in which the inner ring 14 is smaller as compared with the outer ring 12 can be suppressed.

Furthermore, although the opening part 12c of the outer ring 12 is disposed on an outer circumferential side of the flange face in the above embodiment, the outer ring 12 can also be formed in such a manner that the opening part 12c is disposed on an inner circumferential side of the flange face.

In the case in which the opening part 12c of the outer ring 12 is disposed on the side of a high pressure, the pressure is applied to the inside of the outer ring 12 and the outer ring 12 is pushed and expanded outward, whereby a self tightness function is displayed.

The invention claimed is:

1. A metal gasket comprising an outer ring that is formed in a substantially C-shaped cross-section in a longitudinal direction having an opening in a circumferential direction and an inner ring that is arranged in a fitting state inside the outer ring,
   wherein said inner ring is a quadrangular shape cross-section in the longitudinal direction, and a pair of corner portions opposing to each other in the inner ring are disposed on inner circumferential face on the both sides of said opening in said outer ring and in contact with said outer ring.

2. The metal gasket as defined in claim 1, wherein said quadrangular shape cross-section is a hollow cross-section.

3. The metal gasket as defined in claim 1, wherein said corner portions are in an arc shape.

4. The metal gasket as defined in claim 1, wherein a metal of said inner ring is harder than a metal of said outer ring.

5. The metal gasket as defined in claim 1, wherein a soft layer is disposed on at least a surface on an outer circumferential side of said outer ring.

6. The metal gasket as defined in claim 2, wherein said corner portions are in an arc shape.

7. The metal gasket as defined in claim 2, wherein a metal of said inner ring is harder than a metal of said outer ring.

8. The metal gasket as defined in claim 3, wherein a metal of said inner ring is harder than a metal of said outer ring.

9. The metal gasket as defined in claim 2, wherein a soft layer is disposed on at least a surface on an outer circumferential side of said outer ring.

10. The metal gasket as defined in claim 3, wherein a soft layer is disposed on at least a surface on an outer circumferential side of said outer ring.

11. The metal gasket as defined in claim 4, wherein a soft layer is disposed on at least a surface on an outer circumferential side of said outer ring.

* * * * *

UNITED STATES PATENT AND TRADEMARK OFFICE
CERTIFICATE OF CORRECTION

PATENT NO.      : 8,485,534 B2
APPLICATION NO. : 12/993628
DATED           : July 16, 2013
INVENTOR(S)     : Ohmi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this

Eighth Day of September, 2015

Michelle K. Lee
*Director of the United States Patent and Trademark Office*